United States Patent [19]
Gotoh

[11] Patent Number: 5,606,207
[45] Date of Patent: Feb. 25, 1997

[54] POWER GENERATING APPARATUS FOR A BICYCLE

[76] Inventor: Kazuhiko Gotoh, 28-204 Wakaba choo Danchi, 4-25-1 Wakaba choo, Tachikawa, Tokyo, Japan

[21] Appl. No.: 420,283

[22] Filed: Apr. 11, 1995

[51] Int. Cl.$^6$ .................................................. H02K 11/00
[52] U.S. Cl. .................. 310/67 A; 310/91; 310/67 R; 280/221; 280/222; 280/223; 248/674; 248/224.7
[58] Field of Search .................. 310/67 R, 67 A, 310/91; 362/192, 193; 322/1, 112; 280/221, 222, 223; 224/42.45; 248/674, 224.7; 403/DIG. 4, 362

[56] References Cited

U.S. PATENT DOCUMENTS

| | | | |
|---|---|---|---|
| 4,476,406 | 10/1984 | Komatsu | 310/67 A |
| 4,677,328 | 6/1987 | Kumakura | 310/67 A |
| 4,767,130 | 8/1988 | Fu-Chao | 280/202 |
| 4,839,548 | 6/1989 | Bech | 310/67 A |
| 4,860,176 | 8/1989 | Bauwens et al. | 310/67 A |
| 4,934,572 | 6/1990 | Bowman et al. | 224/42.45 |
| 5,024,303 | 6/1991 | Kosloff | 188/300 |
| 5,092,504 | 3/1992 | Hannes et al. | 224/42.45 |
| 5,115,159 | 5/1992 | Takamiya et al. | 310/67 A |

*Primary Examiner*—Thomas M. Dougherty
*Assistant Examiner*—Elvin G. Enad
*Attorney, Agent, or Firm*—Kanesaka & Takeuchi

[57] ABSTRACT

A power generating apparatus for a bicycle, in particular, a racer type bicycle such as a road racer and a mountain bike, is disclosed. The power generating apparatus of the present invention composed of a power generating unit and a mount stay having suitable means for mounting the power generating unit on a bicycle. In this power generating unit, a rotor is integrated with a cylindrical circumference portion of a housing of the power generating unit. The mount stay is fitted on a front portion of a frame of a bicycle with a bolt. On this mount stay, the power generating unit is detachably mounted so that the rotor may rotate by the tire of the bicycle in contact with the cylindrical circumference portion of the rotor.

6 Claims, 8 Drawing Sheets

5,606,207

POWER GENERATING APPARATUS FOR A BICYCLE

FIELD AND BACKGROUND OF THE INVENTION

The present invention relates to a power generating apparatus for a bicycle, in particular, a racer type such as a road racer and a mountain bike.

Up to now, a battery-powered light had been used in a bicycle for racing because a power generating apparatus gives bad influence to its appearance and running performance.

Therefore, the power generating apparatus is rarely used in a bicycle for racing in general. But, it is uneconomical to use the battery-powered light because exchange of an exhausted battery is necessary.

SUMMARY OF THE INVENTION

In view of the above-mentioned problem, it is an object of the present invention to provide a power generating apparatus which is detachably and easily mounted on a bicycle.

The power generating apparatus of the present invention is composed of a power generating unit and a mount stay having suitable means for mounting the power generating unit on a bicycle.

The power generating unit used in the present invention is a kind of a usual power generating unit in which an outer cylindrical surface of a rotor is exposed outside the power generating unit and the rotor is rotatably supported by bearings of a stator frame of the stator.

The mount stay is fixed on a front portion of a frame of a bicycle with a bolt. On this mount stay, the power generating unit is detachably mounted so that the rotor may rotate by the tire of the bicycle in contact with the outer cylindrical surface of the rotor.

Because the power generating apparatus of the present invention is detachably mounted on a bicycle, it can be removed when a head light is not in use. Therefore, an appearance and running performance of the bicycle, in particular a racer, are kept well.

DETAILED DESCRIPTION OF THE INVENTION

Figure 1:
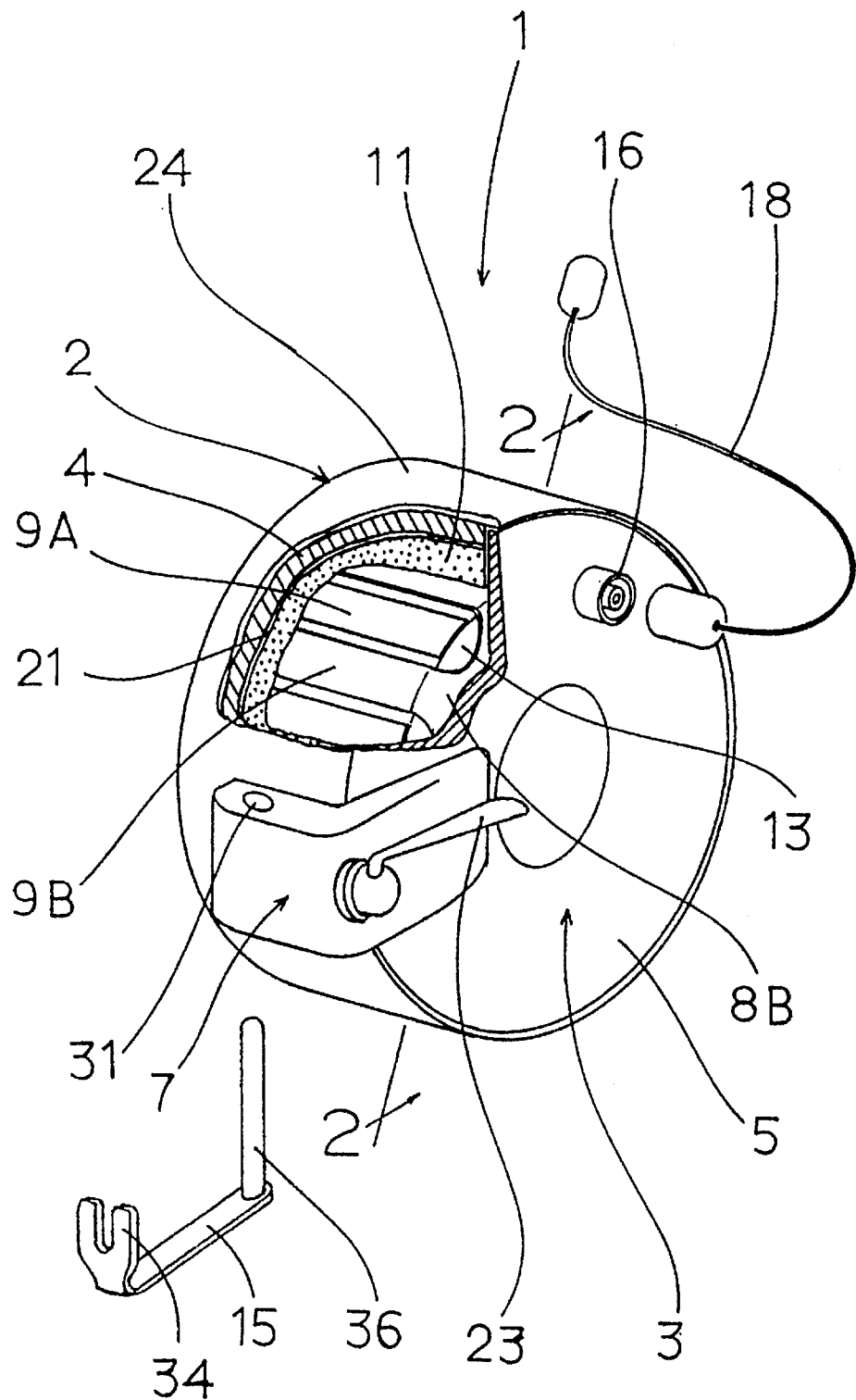
FIG. 1 is a partially cutaway perspective view showing one embodiment of the present invention.
Figure 2:
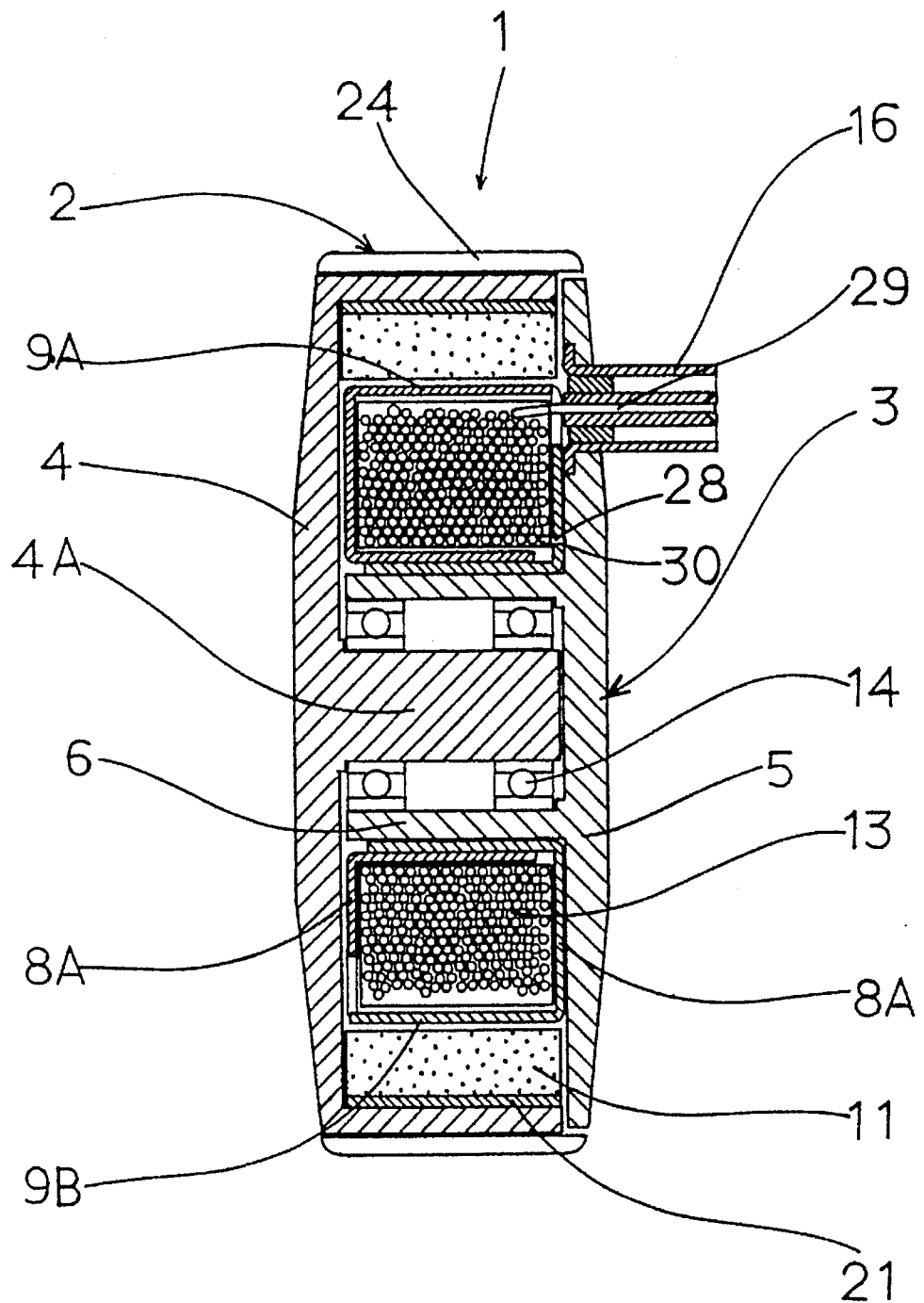
FIG. 2 is a cross-sectional view taken on line 2—2 of FIG. 1.

This invention will be described in detail hereinafter with the embodiments shown in figures. Referring to the embodiment of the present invention shown in FIGS. 1 to 9 inclusive, there are illustrations of an embodiment of a power generating apparatus for a bicycle as disclosed in the present invention hereof.

The power generating apparatus of the present invention comprises a power generating unit 1 and a stator arm 7 and a mount stay 15.

A power generating unit 1 comprises a rotor 2 and a stator 3. The rotor 2 comprises a rotor frame 4 and a ring-shaped magnet 11. The rotor frame 4 has a substantially cylindrical side wall on the circumference thereof. A ring-shaped rubber belt 24 is glued on the outer surface of the substantially cylindrical side wall on the circumference of the rotor 2 so that the rotor 2 may be driven by the ring-shaped rubber belt 24 pushed against a tire 22 of a bicycle. The ring-shaped magnet 11 includes a plural of N and S poles, each of which is arranged alternately inside a substantially cylindrical yoke 21. The ring-shaped magnet is put inside the substantially cylindrical side wall of the rotor 2. A rotational shaft 4A provided on the center of the rotor frame 4 to rotationally support the rotor 2 is fitted into bearings 14 within a bearing housing 6 of the stator 3.

The stator 3 comprises a stator frame 5, a winding assembly 12, and a stator arm 7. The stator arm 7 formed in the shape of L is welded or attached by any other suitable attaching means to the outer periphery of the stator frame 5, extending outwardly from the circumference of the stator frame 5. The stator arm 7 has a mount hole 31 penetrating vertically at the one end of the stator arm 7. A clamp bolt 33 having a clamping lever 23 on a bolt head thereof is threaded into a threading hole 32 of the stator arm 7 at a right angle to the mount hole 31.

Figure 3:
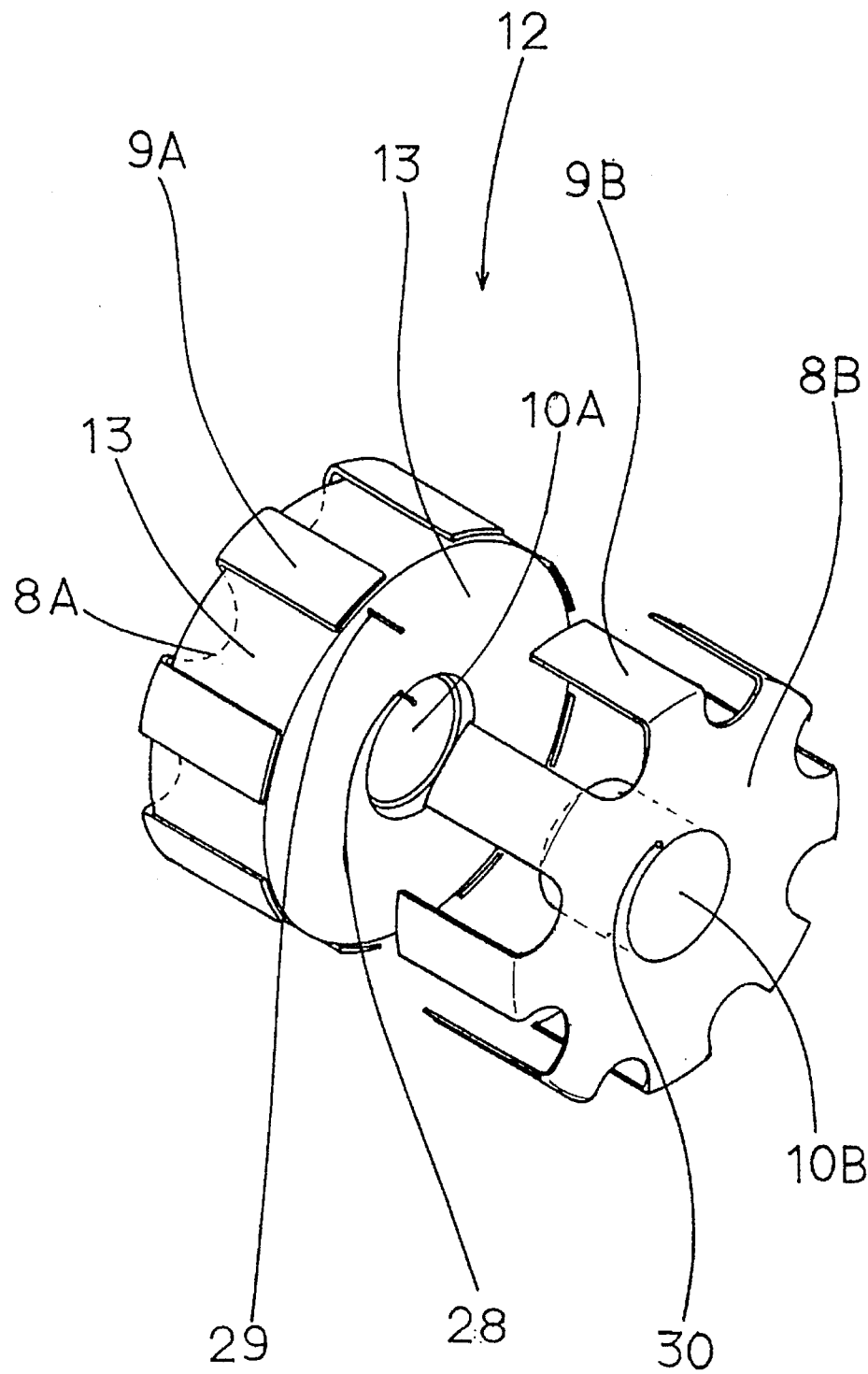
FIG. 3 is a perspective view showing the winding assembly shown in FIG. 1 and FIG. 2.
Figure 4:
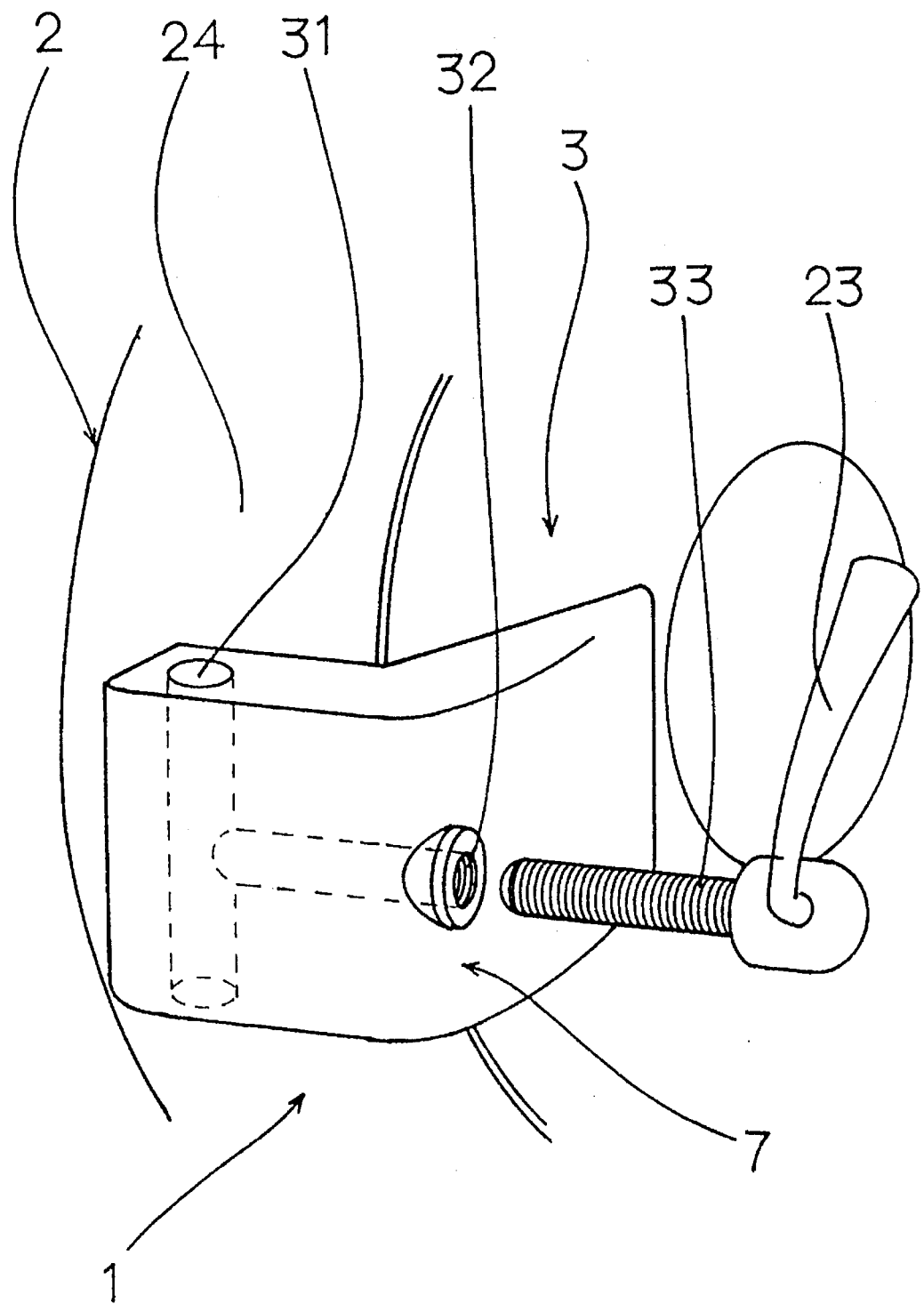
FIG. 4 is an enlarged perspective view showing a part of a stator arm shown in FIG. 1.

As shown in FIG. 3, the winding assembly 12 includes two iron cores 8A and 8B respectively having cylindrical portions 10A and 10B in the center thereof, eight pairs of pole pieces 9A and 9B which function as positive and negative pole pieces, and a winding 13 for generating an electric output. The two iron cores 8A and 8B are connected integrally with each other by means of the two cylindrical portions 10A and 10B rigidly fitting each other. The winding 13 for generating an electric output is wound around the cylindrical portions 10A and 10B inside the pole pieces 9A and 9B. The eight pairs of pole pieces 9A and 9B, integrally formed with the iron cores 8A and 8B respectively, are disposed on the outer periphery of the iron cores 8A and 8B at a right angle to the iron cores 8A and 8B respectively. Each of the pole pieces 9A and 9B is arranged alternately to face each other. The winding assembly 12 is fitted to the bearing housing 6 provided in the center of the stator frame 5.

A lead wire 28, one of lead wires of the winding 13 is connected to a connection hole 30 of the iron core 8B and a lead wire 29, the other of lead wires of the winding 13, is connected to an inner terminal of an output connector 16 located on the end surface of the stator frame 5. The bottom of the outer sleeve of the output connector 16 is connected to the iron core 8B to which the lead wire 28 of the winding 13 is connected.

In the power generating unit 1 constructed as described above, when the rotor 2 is driven by means of the ring-shaped rubber belt 24 pushed against the tire 22 of a bicycle, electric power will be generated in the winding 13 because a direction of flow of magnetic flux flowing through the cylindrical portions 10A and 10B and the pole piece 9A and 9B from the ring-shaped magnet 11, continues changing alternately. The electric power will be supplied to a head light 17 of the bicycle through an extension cable 18 from the output connector 16.

Figure 5:
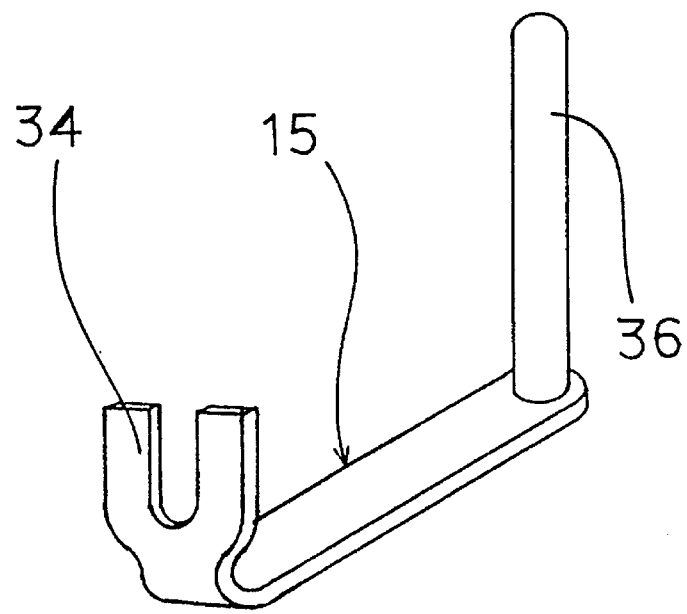
FIG. 5 is a perspective view showing a mount stay for a road racer type bicycle shown in FIG. 1.

FIG. 5 is an enlarged perspective view of a mount stay 15 for a road racer type bicycle, which has a mount shaft 36 vertically standing in one end of the mount stay 15 and a U-shaped portion 34 extending upwardly in the other end of that.

Figure 7:
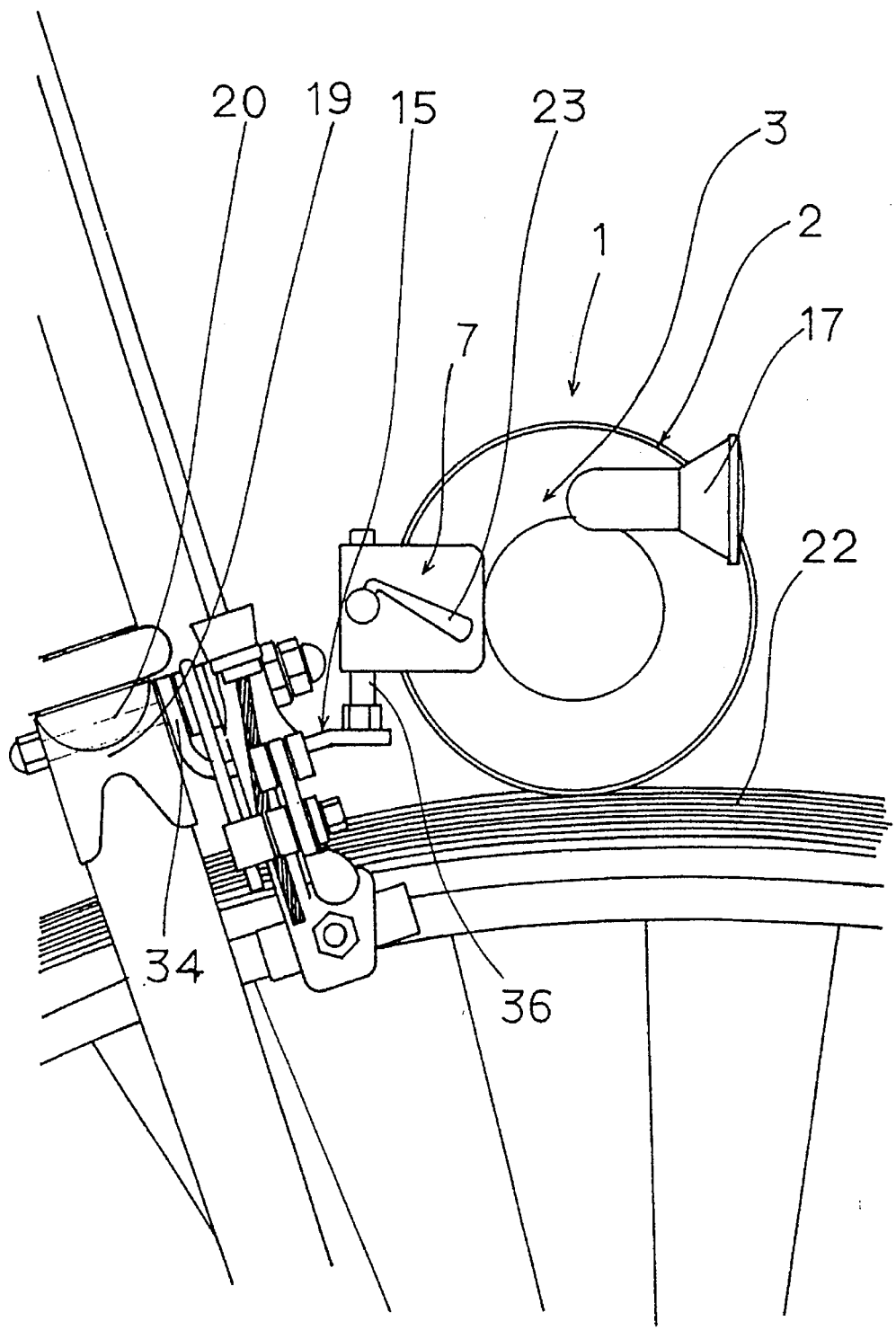
FIG. 7 is a partial side elevation showing the one embodiment of the power generating apparatus which is mounted on the road racer type bicycle and in use.

FIG. 7 is a partial view showing the power generating apparatus which is mounted on a road racer type bicycle. The U-shaped portion 34 of the mount stay 15 is fixed between a brake-mounting plate for attaching brakes and the front fork shoulder 19 of the bicycle with a nut and a bolt passing through an open hole 20 of the front fork shoulder 19. The mount shaft 36 of the mount stay 15 is fitted into the mount hole 31 of the stator arm 7 and clamped from the side thereof with the clamp bolt 33 having a clamp lever 23, so that the rotor 2 of the power generating unit 1 may rotate by being pushed against the tire 22 of the bicycle at suitable force.

Accordingly, the power generating unit I of the present invention is detachably mounted on the bicycle.

Figure 6:
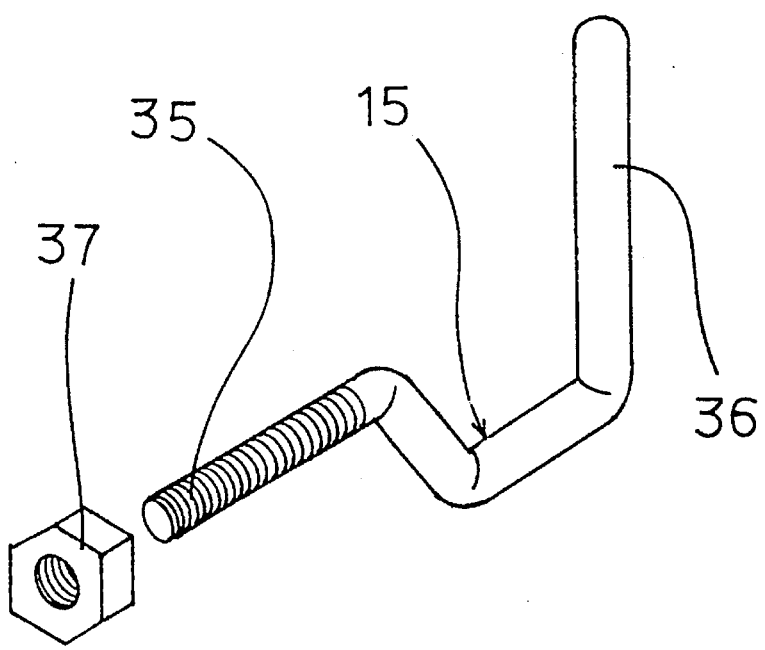
FIG. 6 is a perspective view showing an alternative embodiment of a mount stay for a mountain bike type bicycle.

FIG. 6 is an enlarged perspective view of an alternative embodiment of a mount stay 15 for a mountain bike type bicycle, which has a mount shaft 36 vertically standing at one end of the mount stay 15 and a threaded portion 35 at the other end of that.

Figure 8:
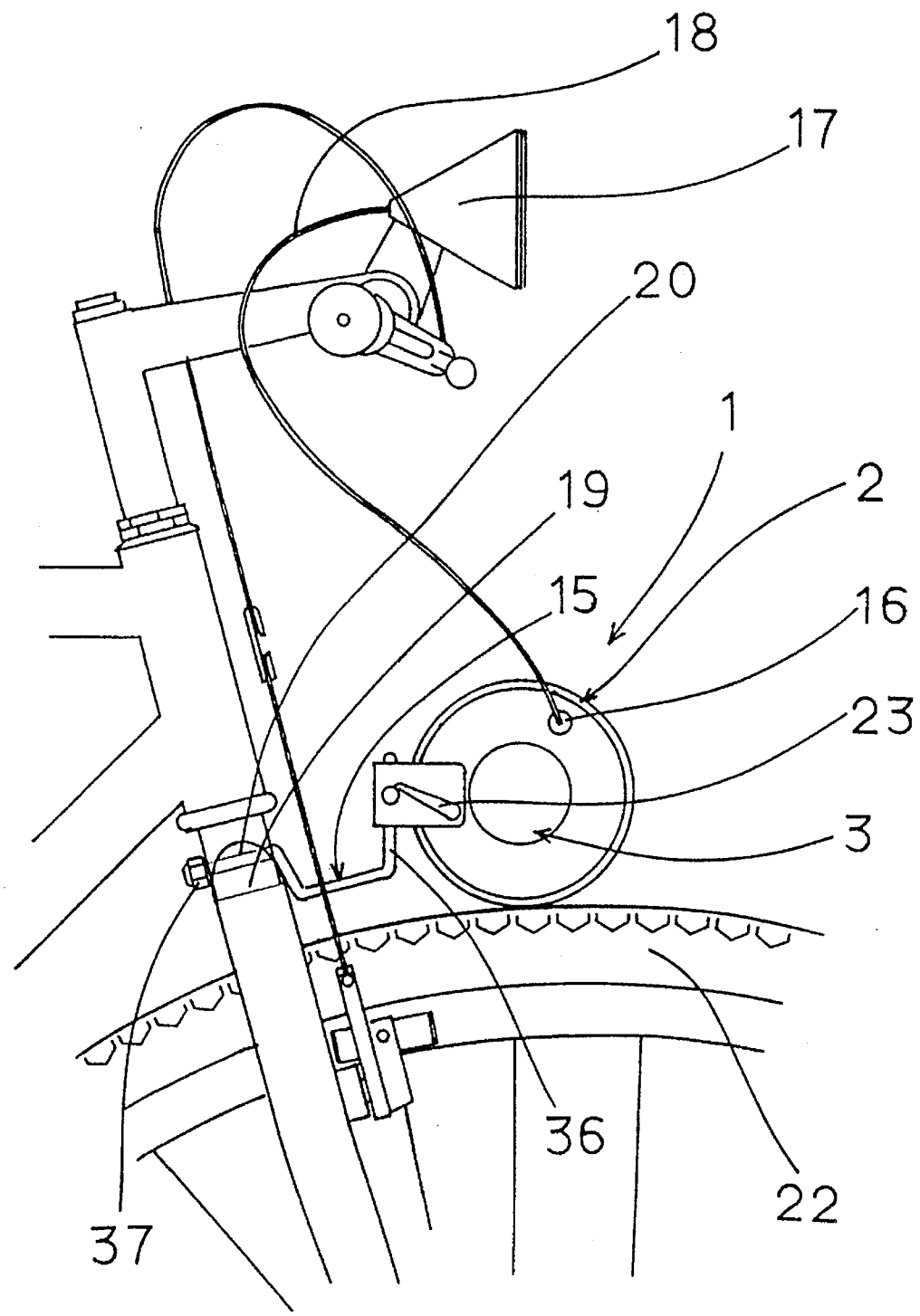
FIG. 8 is a partial side elevation showing the power generating apparatus incorporating the alternative embodiment of a mount stay for the mountain bike type bicycle, which is mounted on the mountain bike type bicycle and in use.

FIG. 8 is a partial side elevation showing the power generating apparatus incorporating the alternative embodiment of the mount stay 15, which is mounted on a mountain bike type bicycle. The threaded portion 35 of the mount stay 15 passes through an open hole 20 of the front fork shoulder 19 and the mount stay 15 is fixed to the front fork shoulder 19 with the nut 37 and the threaded portion 35 of the mount stay 15. The mount shaft 36 of the mount stay 15 is fitted into the mount hole 31 of the stator arm 7 of the power generating apparatus and clamped from the side thereof with the clamp bolt 33 having the clamp lever 23, so that the rotor 2 of the power generating apparatus may rotate by means of the rotor 2 pushed against the tire 22 at suitable force.

Accordingly, the power generating apparatus of this embodiment, also, is detachably mounted on the bicycle.

Figure 9:
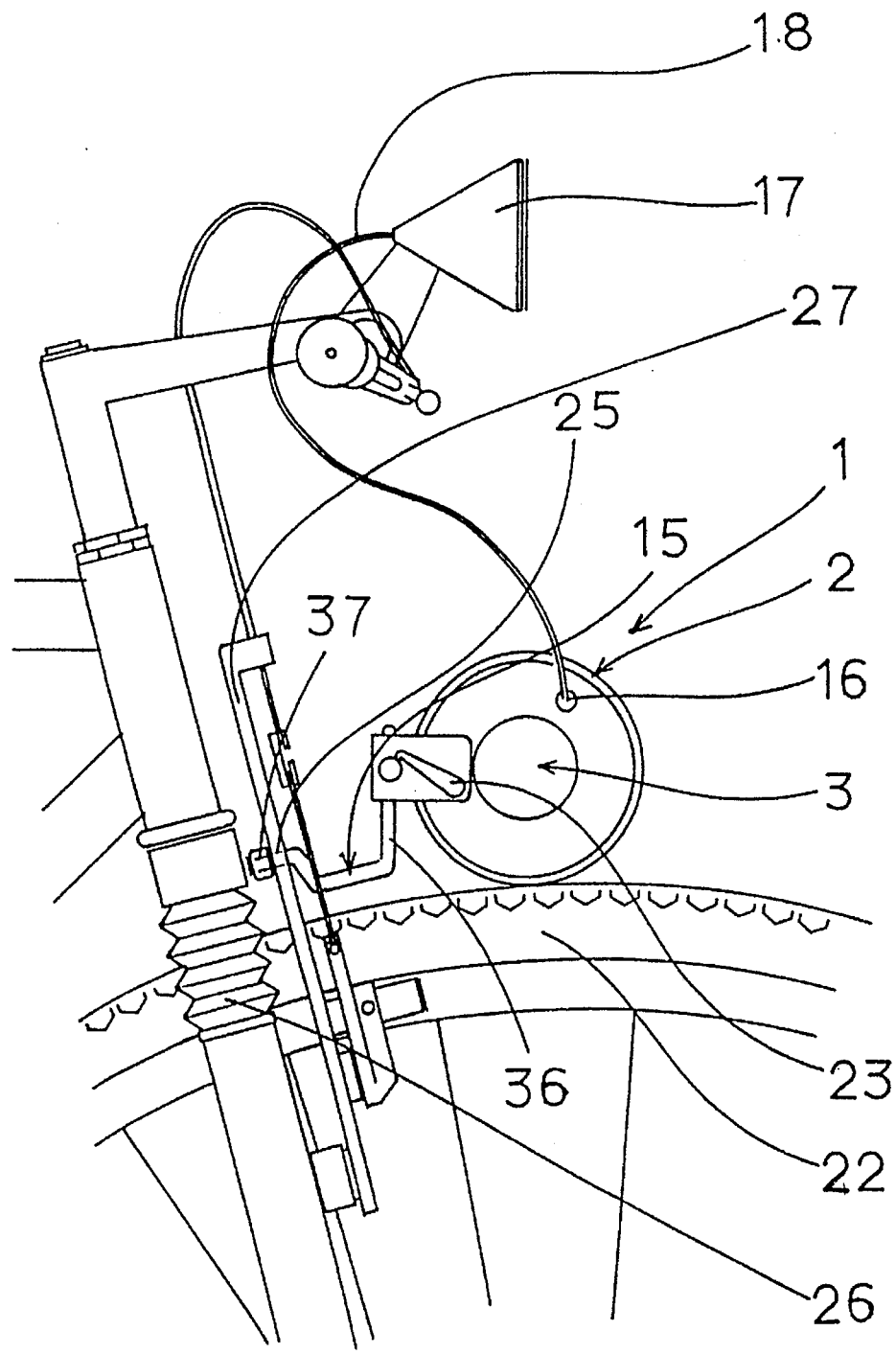
FIG. 9 is a partial side elevation showing the power generating apparatus incorporating the alternative embodiment of the mount stay for the mountain bike type bicycle, which is mounted on the mountain bike type bicycle with a front fork wheel suspension and in use.

FIG. 9 is a partial side elevation showing the power generating apparatus incorporating the alternative embodiment of the mount stay 15, which is mounted on the mountain bike type bicycle having a front fork wheel suspension 26. The significant difference between the alternative embodiment shown in FIG. 9 and the one embodiment shown in FIG. 8 is that the mount stay 15 is fitted into a center hole 25 of a brake-mounting plate 27 attached in the lower portion of a front fork wheel suspension 26.

Accordingly, the power generating apparatus of this embodiment, also, is detachably mounted on the bicycle.

As has been described in its embodiments, the power generating apparatus of the present invention is detachably mounted on a bicycle and can be removed when a head light is not in use.

Therefore, the appearance and the running performance of the bicycle, in particular a racer, are kept well. The present invention is economical for a user since a battery is not required, and therefore, it doesn't need an exchange nor a recharge of a battery either.

Furthermore, the power generating apparatus of the present invention is easily mounted on any kind of the bicycle without any processing to the frame of the bicycle.

It is to be understood that the invention is not limited to the precise embodiment described above and that minor modification may be made within the scope of the invention.

What is claimed is:

1. A power generating apparatus for a bicycle having a body and tires comprising:

a power generating unit including a stator having a frame, a bearing situated in a center of the frame and a winding assembly fixed to the frame outside the bearing; and a rotor rotatably supported by the bearing of the stator and having a ring shaped magnet surrounding the winding assembly of the stator, and an outer cylindrical surface situated outside the ring shaped magnet so that when the rotor is rotated, the winding assembly generates electricity, a mount stay having an end portion to be fixed to the body of the bicycle and a mount shaft situated away from the end portion and extending upwardly from the bicycle near one of the tires, a stator arm fixed to the frame of the stator and including a mount hole extending perpendicularly to the bearing for introducing the mount shaft therein from a lower portion of the mount hole, and a clamp bolt hole with a female thread portion communicating with the mount hole, and a clamp bolt having a shaft portion with a male thread portion engaging the female thread portion and located in the clamp bolt hole, and a clamp lever fixed to the shaft portion so that when the stator arm is attached to the mount stay by engaging the mount shaft with the mount hole and the clamp bolt in the clamp bolt hole is tightened while the power generating unit is urged onto said one of the tires, a distal end of the clamp bolt abuts against the mount shaft and the power generating apparatus is immovably fixed to the bicycle to thereby detachably fix the power generating apparatus to the bicycle.

2. A power generating apparatus according to claim 1, wherein said ring-shaped magnet has a plurality of magnetic poles arranged inside the rotor, said winding assembly including an iron core, a winding for generating an output and a plurality of pole pieces disposed on an outer periphery of said iron core, said winding being wound around said iron core.

3. A power generating apparatus according to claim 2, wherein said end portion of the mount stay is formed of a U-shaped portion fitted to a front fork shoulder of the bicycle.

4. A power generating apparatus according to claim 2, wherein said end portion of the mount stay is formed of a threaded portion for fixing said mount stay to a front fork shoulder of the bicycle.

5. A power generating apparatus according to claim 2, wherein said stator arm is integrally formed with the frame of the power generating unit.

6. A power generating apparatus according to claim 5, wherein said mount hole extends in a direction substantially perpendicularly to a radius of the rotator.

* * * * *